(12) United States Patent
Mavalankar et al.

(10) Patent No.: US 9,879,626 B1
(45) Date of Patent: Jan. 30, 2018

(54) ENGINE CONDENSATION CONTROL SYSTEM AND METHOD

(71) Applicants: Drushan Mavalankar, Rochester Hills, MI (US); Ethan E Bayer, Lake Orion, MI (US); John R Bucknell, Royal Oak, MI (US); Sangeeta Theru, Troy, MI (US)

(72) Inventors: Drushan Mavalankar, Rochester Hills, MI (US); Ethan E Bayer, Lake Orion, MI (US); John R Bucknell, Royal Oak, MI (US); Sangeeta Theru, Troy, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 15/264,724

(22) Filed: Sep. 14, 2016

(51) Int. Cl.
*F02D 41/14* (2006.01)
*F02D 41/00* (2006.01)
*F02M 35/10* (2006.01)

(52) U.S. Cl.
CPC ..... *F02D 41/0077* (2013.01); *F02D 41/0072* (2013.01); *F02D 41/1444* (2013.01); *F02M 35/1038* (2013.01); *F02M 35/10157* (2013.01); *F02M 35/10222* (2013.01); *F02D 2041/1472* (2013.01); *F02D 2200/0414* (2013.01); *F02D 2200/0418* (2013.01)

(58) Field of Classification Search
CPC ...... F02D 41/14; F02D 41/00; F02D 41/0077; F02D 41/0072; F02D 41/1444; F02D 2041/1472; F02D 2200/0414; F02D 2200/0418; F02M 35/10; F02M 35/10157; F02M 35/10222; F02M 35/1038

See application file for complete search history.

(56) References Cited

U.S. PATENT DOCUMENTS

| | | | |
|---|---|---|---|
| 6,934,621 B2 | 8/2005 | Bhargava et al. | |
| 8,910,476 B2 | 12/2014 | Nam et al. | |
| 9,004,046 B2 * | 4/2015 | Glugla | F02M 25/0227 123/542 |
| 9,464,568 B2 * | 10/2016 | Jones | F02B 63/02 |
| 2014/0123963 A1 | 5/2014 | Glugla et al. | |
| 2017/0101968 A1 * | 4/2017 | Hayashi | F02M 35/10222 |

* cited by examiner

*Primary Examiner* — Hieu T Vo
(74) *Attorney, Agent, or Firm* — Ralph E Smith

(57) ABSTRACT

A system and method for controlling condensation formation in an engine having EGR and forced induction includes a controller for determining a water vapor mass fraction of an exhaust stream based on a water vapor mass fraction of an intake stream and water vapor from combustion. An estimated condensation temperature (CT) is determined for a current EGR level based on the water vapor mass fractions and is compared to an intake stream temperature upstream of the compressor inlet. The controller commands the current EGR level as a maximum EGR level upon determining the intake stream temperature is less than the CT, and an increase in the current EGR level upon determining the intake stream temperature is greater than the CT. An air charge temperature (ACT) of the forced induction system may be controlled based on utilizing a target ACT as the CT to be controlled by a coolant pump.

14 Claims, 3 Drawing Sheets

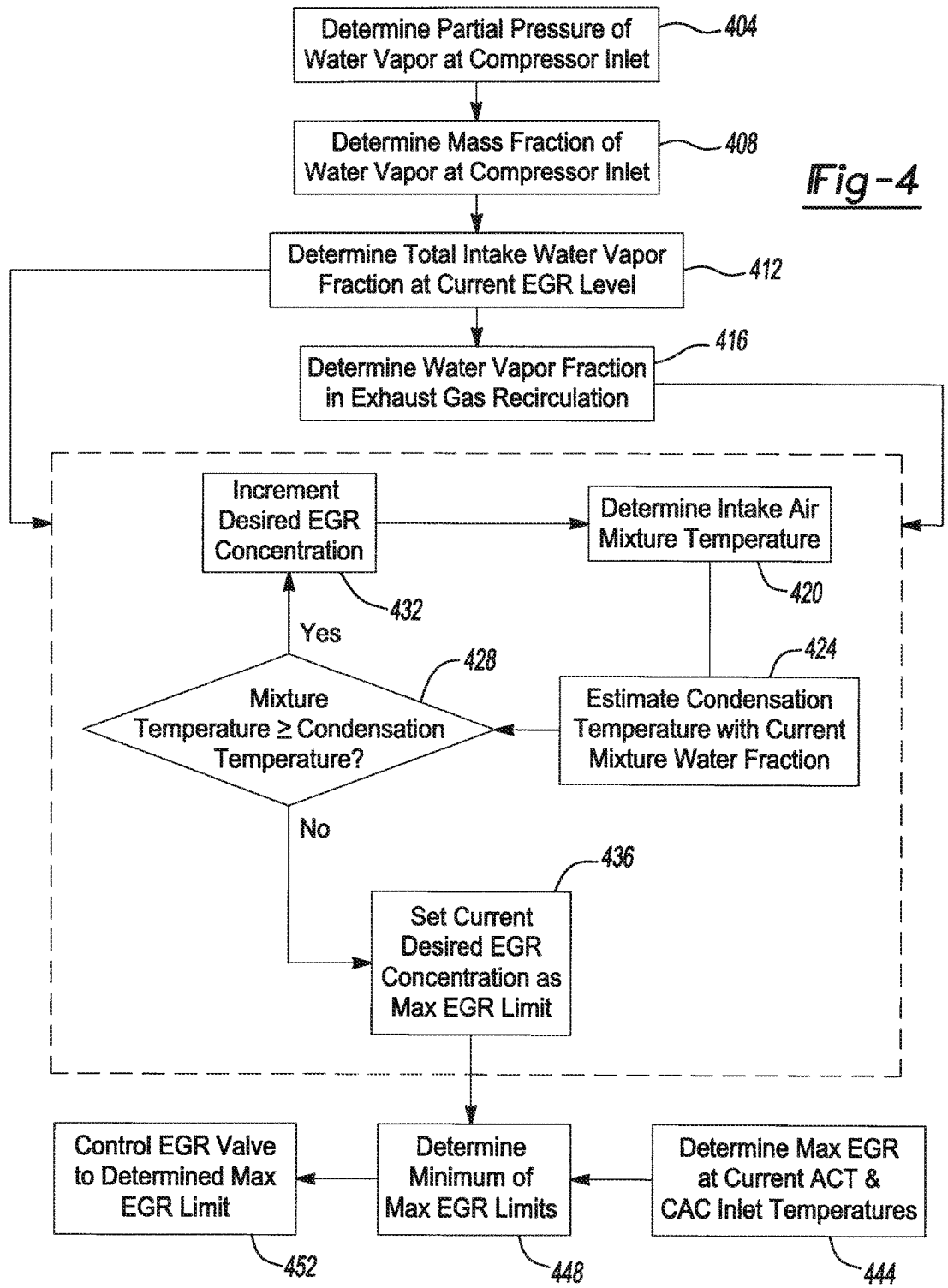

ENGINE CONDENSATION CONTROL SYSTEM AND METHOD

FIELD

The present application relates generally to condensation control in an engine system and, more particularly, to a system and method for condensation control in an engine system utilizing an exhaust gas recirculation (EGR) and/or a forced induction system and associated intercooler.

BACKGROUND

Today's engine systems often utilize exhaust gas recirculation (EGR) to return a portion of exhaust gas to an intake manifold to reduce pumping work and/or help with combustion including combusting any unburned fuel or byproducts present in the recirculated exhaust gas. In this manner, EGR is a known method for pumping work reduction, knock control and $CO_2$ emissions reduction as well as reduction of Nitrogen Oxide (NOx) emissions of internal combustion engines. The returned exhaust gas is combined with fresh air, and both the exhaust gas and fresh air typically contain some varying amount of water vapor. Condensation may occur, for example, when the warmer exhaust gas is mixed with the cooler fresh air. Such condensation over time may lead to poor combustion stability and/or degradation of engine system components due to sulfur based acid formation that reacts with the component materials.

Turbocharged engines often utilize a charge air cooler (CAC) to cool compressed air from the turbocharger before such air enters the intake manifold. Condensation may also form in the CAC depending on an amount of cooling provided by the CAC and an amount of humidity and/or water vapor in the intake air stream. Turbocharged engines with an EGR system, may exhibit higher amounts of water vapor in the intake air due to presence of water vapor in the recirculated exhaust gas, which is mixed with the fresh air before entering the turbocharger. In such a scenario where the intake air entering the CAC includes EGR, the condensation may become acidic and may potentially corrode the CAC housing. The condensation may also accumulate in the CAC housing and may be drawn into the engine, which may also potentially lead to poor combustion stability.

Prior methods for controlling condensation do not accurately predict when condensation would form in connection with EGR, CAC cooling of compressed intake air, and cooling of EGR upstream of compressor. For example, prior attempts to address the above condensation formation include disabling or limiting EGR and/or providing a drain in the CAC to drain condensation accumulated therein. Thus, while such engine systems work for their intended purpose, there remains a need for improvement in the relevant art.

SUMMARY

In accordance with an exemplary aspect of the invention, a method for controlling condensation formation in an engine system having an exhaust gas recirculation (EGR) system and a forced induction system including a compressor is provided in accordance with the teachings of the present application. In one exemplary implementation, the method includes a controller configured to determine a water vapor mass fraction of an intake air stream at a location upstream of an inlet of the compressor, and determine a water vapor mass fraction of an exhaust air stream based on the determined water vapor mass fraction of the intake air stream and water vapor from a combustion event. A temperature of the intake air stream mixture is determined for a current EGR level at the location upstream of the compressor inlet, and an estimated condensation temperature is determined for the current EGR level based at least in part on the determined water vapor mass fractions for the intake and exhaust air streams. The determined intake air stream temperature is then compared to the estimated condensation temperature. The controller then commands i) the current EGR level as a first maximum EGR level upon determining the determined intake air stream mixture temperature is less than or equal to the estimated condensation temperature, and ii) an increase in the current EGR level by a predetermined amount upon determining that the intake air stream mixture temperature is greater than the estimated condensation temperature.

In accordance with an exemplary aspect of the invention, a system for controlling condensation formation in an engine system having an exhaust gas recirculation (EGR) system and a forced induction system including a compressor is provided in accordance with the teachings of the present application. In one exemplary implementation, the system includes a controller in communication with the engine system, the EGR system and one or more temperature and pressure sensors and configured to determine a water vapor mass fraction of an intake air stream at a location upstream of an inlet of the compressor, and a water vapor mass fraction of an exhaust air stream based on the determined water vapor mass fraction of the intake air stream and water vapor from a combustion event. For a current EGR level, a temperature of the intake air stream is determined at the location upstream of the compressor inlet, and an estimated condensation temperature is determined based at least in part on the determined water vapor mass fractions for the intake air stream and the exhaust air stream. The determined intake air stream temperature is then compared to the estimated condensation temperature. The controlled is configured to then command i) the current EGR level as a first maximum EGR level upon determining the determined intake air stream mixture temperature is less than or equal to the estimated condensation temperature, and ii) an increase in the current EGR level by a predetermined amount upon determining that the intake air stream mixture temperature is greater than the estimated condensation temperature.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 4 is an example flow diagram of a method of controlling an engine system and associated EGR system in connection with a turbocharger and associated charge air cooler to control condensation formation according to the principles of the present application.

DESCRIPTION

As briefly mentioned above, the present application relates to condensation control in an engine system having external exhaust gas recirculation (EGR) and/or a turbocharger system and associated charge air cooler (CAC). In the case of EGR systems like low pressure cooled EGR, where EGR is introduced upstream of compressor into the intake stream, depending upon temperature of intake air there is possibility of condensation just upstream of compressor which may pose a potential risk of droplet formation that may potentially damage the compressor blades due to such droplets contacting the compressor blades when they are rotating at a very high rate of speed. Similarly, an intake O2 sensor, which could be positioned post compressor may be affected by such condensation depending on the shielding utilized. Therefore, in accordance with an aspect of the present application, a system and method are presented for controlling a maximum amount of EGR to control condensation formation in connection with intake air stream mixture conditions proximate a compressor inlet, CAC inlet temperature and Air charge temperature (ACT), as will be discussed in greater detail below.

Figure 1:
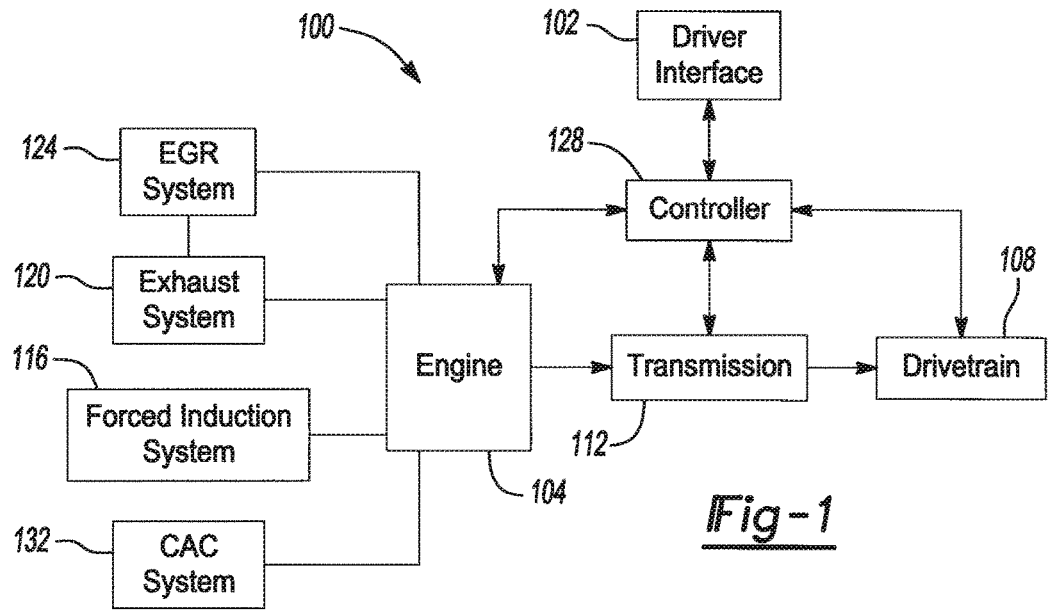
FIG. 1 is a functional block diagram of a vehicle having an engine associated with a forced induction system, an exhaust system and an exhaust gas recirculation (EGR) system according to the principles of the present application.

Referring now to the drawings and initially to FIG. 1, a functional block diagram of an exemplary vehicle 100 is illustrated. The vehicle 100 includes an internal combustion engine 104 that generates drive torque based on a request from a driver interface 102, such as an accelerator pedal. The drive torque generated by the engine 104 is transferred to a drivetrain 108 of the vehicle 100 via a transmission 112, and then from the drivetrain 108 to one or more wheels, as is generally known to those skilled in the art. The drivetrain 108 includes any suitable drivetrain components (a prop shaft differential, a power transfer unit, half shafts, drive shafts, etc.). The engine 104 may include a forced induction system 116, an associated exhaust system 120, an associated EGR system 124, and an associated charge air cooler (CAC) system 132, as will be discussed in greater detail below.

The vehicle 100 also includes an electronic control system or controller 128 that controls operation of the vehicle and/or various aspects of components of vehicle 100. It will be appreciated that while the discussion will continue with reference to controller 128, the vehicle 100 can include multiple controllers or control systems (e.g., transmission controller, engine controller, body controller, etc.) in signal communication with a vehicle communication bus or controller area network. In the example illustrated and discussed below, the controller 128 may include one or more processors and other suitable components (a communication device, memory, etc.).

Figure 3:
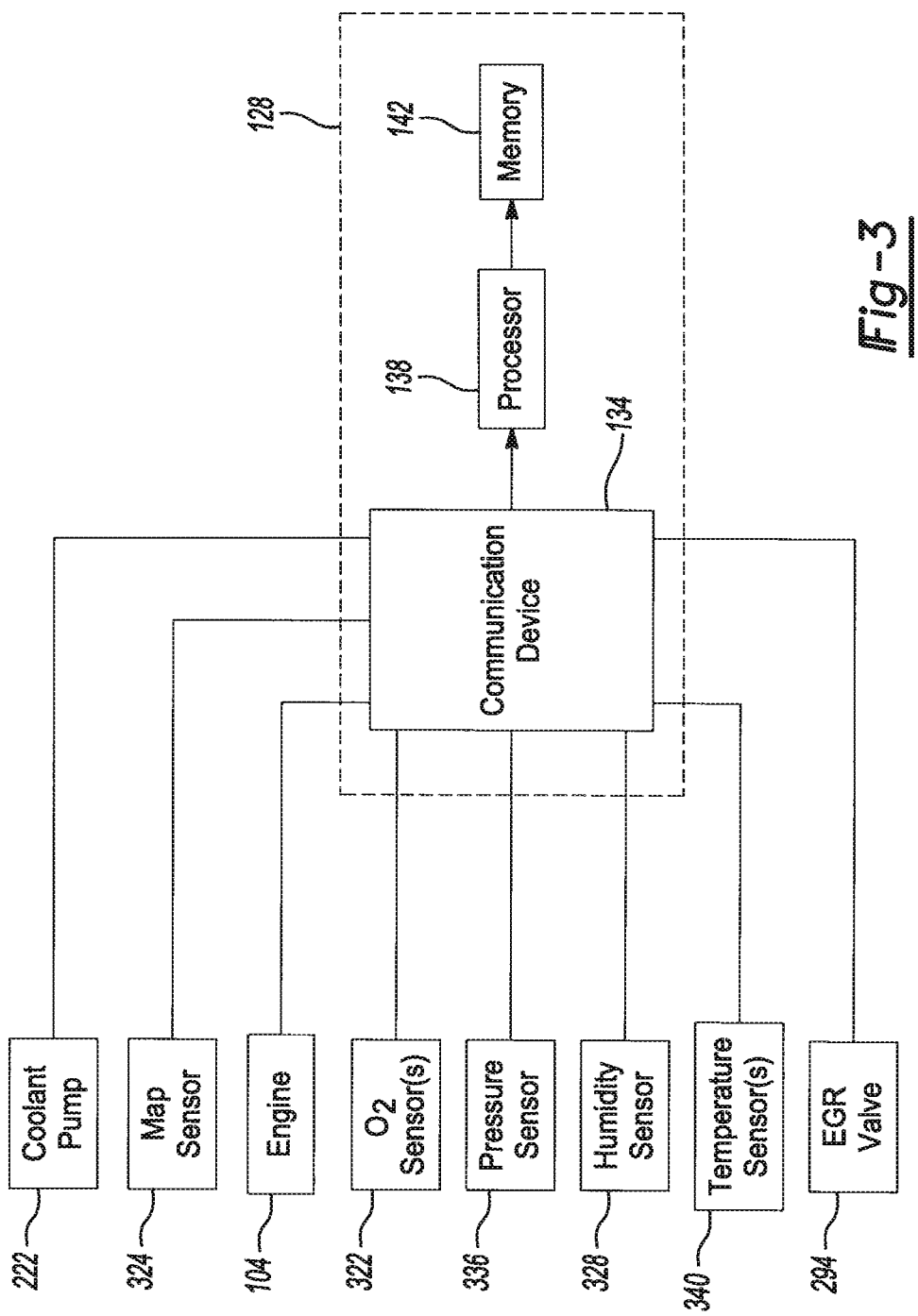
FIG. 3 is an example functional block diagram of an exemplary controller or electronic control system according to the principles of the present application.

Specifically, the exemplary controller or control system 128 in this example may include a communication device 134 and one or more processors 138 in communication with the communication device 134 and a memory 142, as shown in FIG. 3. Examples of functions performed by the processor(s) 138 include loading/executing an operating system of the controller 128, controlling transmission by and processing information received via the communication device 134, and controlling read/write operations at the memory 142. It will be appreciated that the term "processor" as used herein refers to both a single processor and two or more processors operating in a parallel or distributed architecture. The processor 138 also executes the control procedure and control techniques of the present disclosure, which are also described in greater detail below.

The controller 128 is configured to at least control the engine 104 in connection with a torque request via a driver interface 102 to achieve a desired drive torque. The driver interface 102 may include any suitable components for interpreting a torque request from the driver of the vehicle, e.g., an accelerator pedal. The controller 128 may also control operation of the engine 104, forced induction system 116 and EGR system 124 of the vehicle 100 according to the techniques of the present application, which are described in further detail below.

With additional reference to FIG. 2, the illustrated engine 104, forced induction system 116, exhaust system 120 and EGR system will now be discussed in greater detail. As shown, the engine 104 is a four cylinder engine, although other engine configurations are contemplated. For example, other in-line engine configurations as well as V-engine configurations are contemplated. Thus, while the discussion will continue with reference to the schematically shown four cylinder in-line engine, it will be appreciated that the discussion is not so limited to this engine configuration.

Continuing with reference to FIGS. 1-3, the illustrated engine 104, forced induction system 116, exhaust system 120, EGR system 124 and CAC system 132 will now be discussed in greater detail. In the exemplary implementation illustrated, the engine 104 includes, among other components and features, a cylinder head 208, a cylinder block (not specifically shown), an intake manifold 212 in fluid communication with the cylinder head 208 and an exhaust manifold 216 associated with the cylinder head 208 and in fluid communication therewith. A charge air cooler 220 is provided and may be optionally associated with the intake manifold 212. A coolant pump 222 is associated with the charge air cooler 220 for circulating coolant from a low temperature radiator circuit for cooling the charge air cooler 220. The forced induction system 116 includes or is provided in the form of a turbocharger 224, which includes, in one exemplary implementation, a compressor 228 mechanically coupled to a turbine 232.

The exhaust system 120 includes at least one emission control device 244, which is shown in the exemplary system as a catalyst. Exhaust gas piping 254 is provided from the exhaust manifold 216 to the turbocharger turbine 232 and from the turbocharger turbine 232 to the emission control device 244 and beyond. The EGR system 124, in the exemplary implementation illustrated, includes piping or a flow passage or loop 270 having an inlet 274 associated with the exhaust system 120 and fluidly coupled thereto at a location of the exhaust system piping 254 downstream of the catalyst 244. It will be appreciated, however, that other locations may be utilized.

The EGR flow passage 270 also includes an outlet 284 proximate to or at an inlet to the compressor 228. In the exemplary implementation illustrated, the outlet 284 is fluidly coupled to intake piping that is fluidly coupled to the compressor 228 inlet, as will be discussed in greater detail below. An EGR cooler 290 and an EGR valve 294 are disposed in the EGR piping or loop 270. The EGR cooler 290 includes an inlet 298 and an outlet 302 and the EGR valve 294 is positioned, in the exemplary implementation illustrated, downstream of the EGR cooler 290 and upstream of the outlet 284, as shown in FIG. 2. In this exemplary implementation and in connection with control of EGR valve 294 by controller 128, exhaust gas is selectively allowed to flow from engine 104 through EGR cooler 290, through EGR valve 294 and to the intake system piping 310 upstream of compressor 228 where it mixes with fresh air from airbox 314.

Figure 2:
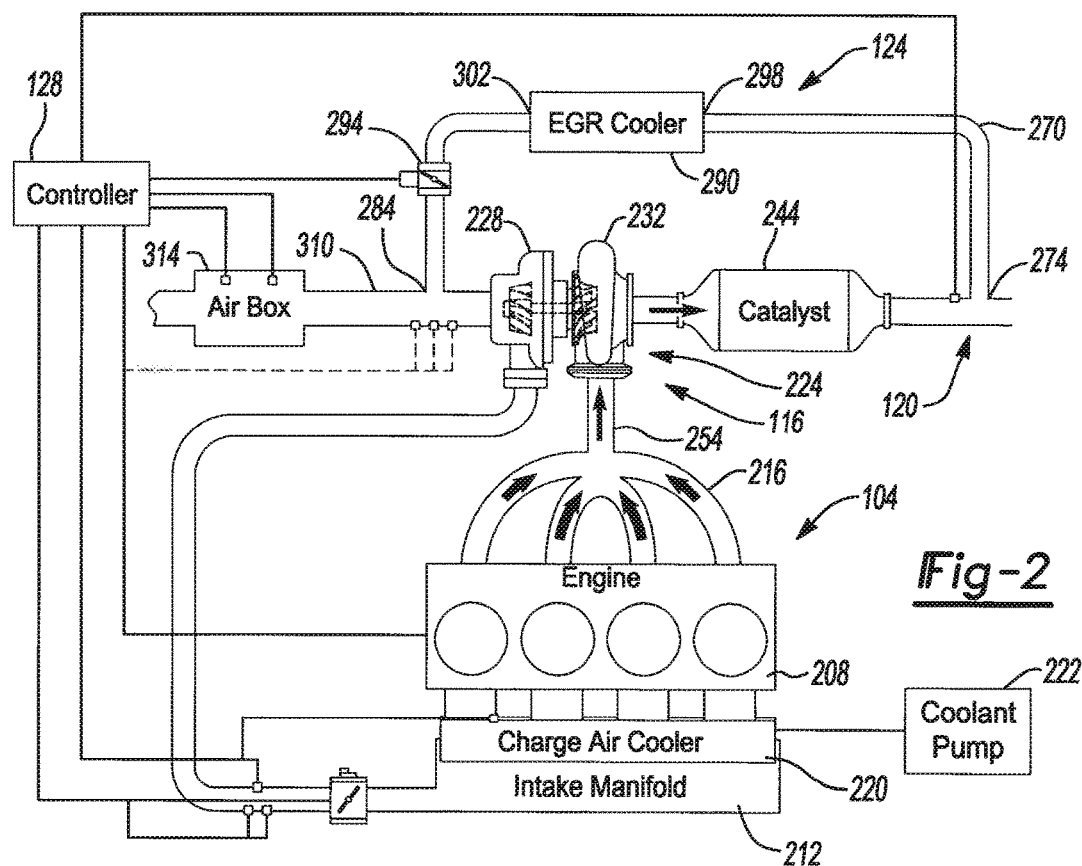
FIG. 2 is an example partial schematic diagram of an engine system according to the principles of the present application.

A flow passage or piping 310 is provided from an air box 314 to the compressor 228 inlet of the turbocharger 224, and also from an outlet of compressor 228 to a throttle valve 318 and intake manifold 212, as also shown in FIG. 2. As mentioned above, the outlet 284 of the EGR system loop 270 is fluidly coupled to the flow passage between the airbox 314 and compressor 228 and/or upstream of the compressor 228.

The engine system 104 also includes various sensors including a MAP sensor 324, humidity sensor 328, one or more oxygen sensors 332, and optional pressure and temperatures sensors 336, 340 upstream of the compressor 228 inlet and optionally the throttle valve 318 and downstream of the CAC 220. In the exemplary implementation illustrated, the humidity sensor 328 is associated with the airbox 314 and is configured to sense or measure the humidity of air present and/or flowing in the airbox 314.

As can also be seen in FIGS. 1-3, the controller 128 is in communication with and controls operation of the engine system 104. In the exemplary implementation illustrated and as briefly discussed above, the controller 128 communicates with at least the throttle valve 318, the engine 104, the EGR valve 294, the MAP sensor 324, the humidity sensor 328, the oxygen sensor(s) 332, the pressure sensor(s) 336, and the temperature sensor(s) 340. The controller 128 also executes the control procedure and/or control techniques of the present application, which are also described in greater detail below.

With continuing reference to FIGS. 1-3 and additional reference to FIG. 4, condensation control techniques or strategies for controlling (e.g., minimizing or eliminating) condensation formation in an engine having external EGR and/or a turbocharger system with an intercooler will now be discussed in greater detail. In one exemplary implementation, the partial pressure of water vapor in ambient air at the inlet of compressor 228 is determined by controller 128 at block 404, such as by the exemplary equation below:

$$P_{pp,H_2O} = \frac{P_{CompSat} \times \phi_{rel}}{100}, \quad (1)$$

where $P_{CompSat}$ is $f(T_{ambient})$ or $f(T_{compIn})$ depending on measurement availability and is determined via a look up table stored at controller 128. The ambient and compressor inlet temperatures ($T_{ambient}$) and ($T_{compIn}$) are inputs provided by a sensor or sensors, such as dedicated temperature sensors or one or more of a humidity sensor, temperature sensor or a mass sir flow sensor; and $\varphi_{rel}$ is the relative humidity in percentage from the humidity or mass air flow HTP sensor 328.

Using the partial pressure of water vapor ($P_{pp,H_2O}$) determined with equation (1), the mass fraction of water vapor in ambient air at the compressor inlet is determined at block 408, such as with the exemplary equations below:

$$\text{molar fraction of } H_2O, \omega_{H_2O} = \frac{P_{pp,H_2O}}{P_{CompIn}}, \quad (2a)$$

where $P_{CompIn}$ is obtained from the mass air flow HTP sensor or can be modeled. Equation (2a) is then used to determine the molecular weight of the mixture ($M_{mix}$) at the compressor inlet by, for example, the following equation:

$$M_{mix} = \omega_{H_2O} \cdot M_{H_2O} + (1-\omega_{H_2O}) \cdot M_{DA} \quad (2b),$$

where $$M_{H_2O} = 18.015 \frac{g}{mol}$$

and $$M_{DA} = 29 \frac{g}{mol}.$$

The mass fraction of water vapor in ambient air ($\chi_{H_2O}$) is then determined using the following equation:

mass fraction of $$H_2O, \chi_{H_2O} = \omega_{H_2O} \cdot \frac{M_{H_2O}}{M_{mix}}. \quad (3)$$

At block 412, the controller 128 determines the total intake water vapor mass fraction at the current level of EGR, which includes, in the exemplary technique discussed below, water vapor from ambient air intake at the current time of calculation or determination and water vapor from the previous combustion event. The water vapor at the compressor inlet mixing area from the previous combustion event is brought to the mixing area by EGR. In other words, and with reference to the equations discussed above, the total water vapor fraction at the current EGR level is a combination of water vapor from an immediately prior (time (t)=t−1) combustion event brought to the mixing area by EGR (discussed below in connection with equation (9)) plus water in the current intake air stream (equation (3)).

For determining the total intake water mass vapor fraction, the controller 128 determines the mass fraction of water from EGR using, for example, the following equation:

mass fraction of $H_2O$ from EGR,
$$\chi E_{GRH_2O} = \chi_{egr} \cdot \chi_{ExhH_2O|_{t=t-1}} \quad (4a),$$

where $\chi_{egr}$ is the mass fraction of EGR that is sensed via the intake $O_2$ sensor or can be modeled and $\chi_{ExhH_2O|_{t=t-1}}$ is a combination of equation (3) and water vapor resulting from a prior combustion event at time (t)=t−1, which is discussed below in connection with equation (9). As EGR displaces fresh air in the intake stream, the mass fraction of water from air can be determined, for example, by:

mass fraction of $H_2O$ from Air, $\chi_{InAirH_2O} = (1-\chi_{egr})$
$$\cdot \chi_{H_2O} \quad (4b),$$

where $\chi_{H_2O}$ is from equation (3). The mass fraction of water in the intake can be expressed using Equations 4a and 4b as:

mass fraction of $H_2O$ in intake, $\chi_{InAirH_2O} = \chi_{egrH_2O} +$
$$\chi_{InAirH_2O} \quad (5).$$

As discussed above, considering that the total intake air stream is composed of EGR water vapor and ambient water vapor, the mass fraction of dry air ($\chi_{IntDA}$) can be expressed as:

mass fraction of intake dry air, $\chi_{IntDA} = 1 - \chi_{egr} -$
$$\chi_{InAirH_2O} \quad (6),$$

where, the EGR water vapor is recirculated from the previous combustion event and is determined, in one exemplary implementation, using the technique discussed below.

For dry air flowing into the engine for combustion, the amount of water created from a combustion event using this air is determined based on an equivalency ratio ($\varphi$), expressed below as:

$$\varphi = \left( \frac{\frac{F}{A}}{\left(\frac{F}{A}\right)_{stoich}} \right), \tag{6a}$$

where F/A is the current fuel-air ratio measured from the exhaust $O_2$ sensor(s) relative to the stoichiometric F/A ratio, and this fraction (equation (6a)) is estimated for current dry air flow and fuel flow and is derived from the exhaust wide range $O_2$ sensor readings. Thus, at block 416, the exhaust mass fraction of water ($\chi_{ExhH_2O}$) is determined using the following equation:

$$\text{exhaust mass fraction of } H_2O{:}\chi_{ExhH_2O}{=}\chi_{IntH_2O}{+}\chi_{CombH_2O} \tag{7},$$

where $\chi_{IntH_2O}$ comes from equation (5) and $\chi_{CombH_2O}$ is determined using an empirical relationship set forth below:

$$\chi_{CombH_2O}{=}\chi_{\varphi H_2O}{\cdot}(\chi_{IntDA}{+}\chi_{IntDA}{*}\varphi current) \tag{8},$$

where $\chi_{\varphi H_2O}{=}f(\varphi)$ and is determined through use of a calibrated look-up table.

At the point in the intake system where the EGR mixes with the intake air stream upstream of the compressor inlet, an enthalpy balance is given as set forth in the equations below for a given volume. Based on enthalpy balance at the mixture point, the mixture temperature (Tmix) is given by following equation:

$$T_{mix} = \frac{(1 - \chi_{egr}) \cdot c_{p_a} \cdot T_a + \chi_{egr} \cdot c_{p_e} \cdot T_e}{(1 - \chi_{egr}) \cdot c_{p_a} + \chi_{egr} \cdot c_{p_e}}, \tag{9}$$

where $T_a$ is the intake air temperature, $T_e$ is the EGR temperature at the outlet of the EGR valve, $C_{pa}$ is the specific heat of air, and $C_{pe}$ is the specific heat of the EGR. At block 420, equation (9) is used to determine the intake air mixture temperature for a particular percent of EGR, as briefly discussed below.

So now using the water vapor in ambient air and in exhaust stream (overall intake air mixture at compressor inlet), an iterative process is used where the EGR percentage is incremented by a predetermined calibration amount for a range (e.g., 0-20% EGR), and for each incremented EGR value, the controller 128 evaluates how the water vapor content in the current overall intake air mixture or stream changes (e.g., equations (5) and (7)) and estimates mixture temperature as well as estimates dew point or condensation temperature for that % EGR and the intake pressure. This estimated intake air mixture temperature at the given % EGR is then compared to the condensation or dew point temperature of mixture at that % EGR and the process continues until the estimated mixture temperature equals or is less than the condensation or dew point temperature. The incremented EGR percentage just before the value resulting in the estimated mixture temperature equaling or falling below the condensation temperature is then set as the current maximum EGR limit and/or desired EGR concentration. This aspect of the process is described in greater detail below.

Next at block 424, the condensation temperature or dew point is estimated at the current percent EGR. In one exemplary implementation, this is estimated by determining the partial pressure of water for the current particular incremented EGR value based on estimating the molar fraction from the desired liquid mass fraction, and then using a water vapor pressure table, such as in a look-up table, the dew point temperature is estimated, as set forth in the exemplary equations below in connection with equations (5), (7) and (2a) discussed above.

$$\chi_{Tot_{H_2O_{loop}}} = \chi ExhH_2O \cdot \chi EGR_{loop} + (1 - \chi XEGR_{loop}) \cdot \chi intH_2O \tag{10a}$$

$$\chi_{Con\ H_2O_{loop}} = \chi_{Tot_{H_2O_{loop}}} - \chi_{Tot_{H_2O}}, \tag{10b}$$

$$\omega_{H_2O_{loop}} = \frac{\chi_{Con_{H_2O_{loop}}} \cdot M_{DA}}{\chi_{Con_{H_2O_{loop}}} \cdot M_{DA} + \left(1 - \chi_{Con_{H_2O_{loop}}}\right) \cdot M_{H_2O}}, \tag{10c}$$

$$P_{pp,H_2O_{loop}} = \omega_{H_2O_{loop}} \cdot P_{CompIn} \tag{10d}$$

where "loop" refers to the calculations for a particular percent EGR, $\chi_{Tot_{H_2O_{loop}}}$ is the total water vapor fraction for the loop, $\chi_{EGR_{loop}}$ is the EGR fraction incremented value for the loop, $\chi_{Con\ H_2O_{loop}}$ is the water vapor mass fraction for condensation temp determination for loop, $\chi_{Tot_{H_2O}}$ is the calibration value of water vapor fraction that can be tolerated, $M_{DA}$ is the molecular weight of dry air, $M_{H_2O}$ is the molecular weight of water vapor, $\omega_{H_2O_{loop}}$ is the molar fraction of water vapor for the loop, and $P_{pp,H_2O_{loop}}$ is the partial pressure of water vapor for the loop. At the compressor inlet, this loop is used to determine a minimum percent EGR calculation because there is possibility that to raise the mixture temperature a certain minimum level of percent EGR is required and from the loop it will be known what is the minimum EGR at which there won't be any condensation.

Once the partial pressure of water is estimated for the particular percent EGR concentration (or loop), this value is set by the controller 128 as the saturation pressure of water. Then, using an inverse of the water vapor saturation pressure versus temperature curve, such as with reference to the data being in a look-up table, the dew point temperature is estimated for the particular percent EGR at block 424.

As discussed above, for every iterative loop (incremented EGR percentage) an estimated mixture temperature and dew point temperature are determined by the controller 128, as discussed above, and these estimated values are compared at block 428, as discussed below. Using equation (9), if $T_{mix_{loop}} > T_{dew,mix_{loop}}$, then allow the current percent EGR for that iterative loop calculation and repeat as discussed above incrementing the percent EGR at block 432 until the mixture temperature is no longer greater than the dew point temperature, at which point the current EGR percentage is set by the controller 128 as the desired or maximum EGR limit at block 436.

In addition to controlling EGR to limit condensation formation in connection with EGR and intake air at the compressor inlet, the control techniques of the present application also consider overall or bulk air charge temperature (ACT) and local charge air cooler (CAC) inlet temperature (CIT) in determining the maximum EGR to mitigate or prevent condensation. The controller 128 then determines a minimum of the maximum determined allowable EGR concentrations or percentages at the compressor inlet (discussed above) and based on the ACT and CIT, as will be discussed below.

Using actual ACT and CIT obtained from temperature sensors 340 or modeled, these temperatures are treated as dew point or condensation temperatures. Then using the water vapor pressure saturation curve discussed above, the partial pressure is estimated. The estimated partial pressure is then divided by manifold pressure (obtained from MAP sensor 324) or CAC inlet pressure depending on the hardware configuration to obtain the air mixture molar fraction. The air mixture molar fraction is converted to an air mixture mass fraction by inverting equation (11c). From this mass fraction, a calibrated look-up table is referenced and the mass fraction of water that can be tolerated is obtained and subtracted and a final mass fraction of water for condensation is estimated. Using this estimated mass fraction of water for condensation, the maximum percent EGR can be determined by the controller 128 at block 444, and will be the maximum percent EGR that can be achieved in the CAC 220 before condensation begins for the given ACT and CIT temperatures.

This maximum amount of EGR can be determined by substituting equations (4a) and (4b) into equation (5) for desired water amount and maximum EGR conditions, as follows:

$$\chi_{conH_2O} = \chi_{egr_{max}} \cdot \chi_{ExhH_2O|_{t=t-1}} + (1-\chi_{egr_{max}}) \cdot \chi_{H_2O} \quad (11a),$$

and solving for max EGR ($\chi_{egr_{max}}$), $$\chi_{egr_{max}} = \frac{\chi_{conH_2O} - \chi_{H_2O}}{\chi_{ExhH_2O|_{t=t-1}} - \chi_{H_2O}}, \quad (11b)$$

where $\chi_{conH_2O}$ is the mass fraction of water vapor for condensation. At block 448, the minimum amount of maximum EGR is then determined for each of ACT, CIT and the compressor inlet, and this minimum amount of maximum EGR is selected as the maximum allowable EGR. The EGR valve 284 is then controlled accordingly at block 452 to provide the selected amount of maximum EGR for optimum condensation control.

In addition to the above-discussed EGR control path, condensation can also be controlled based on a desired EGR in connection with the ACT and CIT. For this control technique, the target ACT and CIT temperatures are estimated as the dew point of the mixture plus a calibration offset. Briefly, however, the total molar fraction of water vapor is estimated at the maximum or requested percent EGR condition. Depending on hardware configuration, using manifold absolute pressure or charge cooler inlet pressure, such as from MAP sensor 324, partial pressure of water is determined and the dew point is estimated to which a calibrated offset is added and treated as the target ACT or CIT in a similar manner as discussed above in connection with the water vapor pressure-temperature curve. Example equations are shown below:

$$\chi_{TotH_2O_{CACmax}} = \chi_{ExhH_2O} \cdot \chi_{EGR_{des}} + (1-\chi_{EGR_{des}}) \cdot \chi_{intH_2O} \quad (12a)$$

$$\chi_{con\ H_2O_{cac}} = \chi_{TotH_2O_{CACmax}} - \chi_{TotH_2O} \quad (12b)$$

$$\omega_{H_2O_{max}} = \frac{\chi_{con_{H_2O_{cac}}} \cdot M_{DA}}{\chi_{con_{H_2O_{cac}}} \cdot M_{DA} + (1 - \chi_{con_{H_2O_{cac}}}) \cdot M_{H_2O}} \quad (12c)$$

$$P_{pp,H_2O_{CAC}} = \omega_{H_2O_{max}} \cdot P_{ManIn} \quad (12d),$$

where equation (12c) is derived from equation (10c) and the $P_{pp,H_2O_{CAC}}$ calculated from equation (12d) is used with the water vapor pressure temperature curve to determine the target ACT and CIT in the same manner as discussed above for equation (10d) with a calibration offset added to it; and where $\chi_{TotH_2O_{CACmax}}$ is the total mass fraction of water vapor in the CAC 220 for a desired percentage EGR, $\chi_{EGR_{des}}$ is the desired mass fraction of EGR, and $\chi_{con\ H_2O_{cac}}$ is the mass fraction of water vapor for condensation temperature estimation at the CAC 220. The target ACT/CIT is passed on to the engine coolant thermal management control system, which controls, among other components and systems, the coolant pump 222 in the low temperature radiator circuit, to operate the coolant pump 222 to control the temperature of air in CAC 220 to this target ACT.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It should also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A system for controlling condensation formation in an engine system having an exhaust gas recirculation system and a forced induction system including a compressor, the system comprising:
   a controller in communication with the engine system, the EGR system and one or more temperature and pressure sensors, the controller configured to:
      determine a water vapor mass fraction of an intake air stream at a location upstream of an inlet of the compressor;
      determine a water vapor mass fraction of an exhaust air stream based on the determined water vapor mass fraction of the intake air stream and water vapor from a combustion event;
      determine a current EGR level, a temperature of the intake air stream at the location upstream of the compressor inlet;
      determine, for the current EGR level, an estimated condensation temperature based at least in part on the determined water vapor mass fractions for the intake air stream and the exhaust air stream;
      compare the determined intake air stream temperature to the estimated condensation temperature; and
      command i) the current EGR level as a first maximum EGR level upon determining the determined intake air stream mixture temperature is less than or equal to the estimated condensation temperature, and ii) an increase in the current EGR level by a predetermined amount upon determining that the intake air stream mixture temperature is greater than the estimated condensation temperature.

2. The system of claim 1, wherein commanding the current EGR level as the maximum EGR level includes commanding an EGR valve of the EGR system to maintain its current position, and wherein commanding an increase in the current EGR level includes commanding the EGR valve to open an additional predetermined amount.

3. The system of claim 1, wherein the controller is further configured to determine a partial pressure of water vapor in the intake air stream at the location upstream of the compressor inlet; and wherein the controller is configured to determine the water vapor mass fraction based on the determined partial pressure of water vapor in the intake air stream.

4. The system of claim 1, further comprising a charge air cooler (CAC), wherein the controller is further configured to:
   determine an overall air charge temperature (ACT) and a local (CAC) temperature; and
   determine, based on the determined ACT and CAC temperatures, second and third maximum EGR levels before condensation begins in the CAC.

5. The system of claim 4, wherein the controller is further configured to:
   compare the first, second and third determined maximum EGR levels;
   select the minimum of the first, second and third maximum EGR levels as the selected current EGR level; and
   control an EGR valve of the engine system to provide the selected current EGR level.

6. The system of claim 5, wherein the controller is configured to utilize the determined ACT and CAC temperatures as dew point temperatures and determine the second and third maximum EGR levels based on using the determined ACT and CAC temperatures as dew point temperatures.

7. The system of claim 1, further comprising a low temperature radiator circuit coolant pump in fluid communication with a charge air cooler of the forced induction system.

8. The system of claim 7, wherein the controller is configured to:
   determine a target air charge temperature (ACT) and use the determined target ACT as an estimated dew point temperature; and
   control the coolant pump to control a temperature of the air in the charge air cooler to the target ACT.

9. A method for controlling condensation formation in an engine system having an exhaust gas recirculation system and a forced induction system including a compressor, the method comprising:
   determining, at a controller, a water vapor mass fraction of an intake air stream at a location upstream of an inlet of the compressor;
   determining, at the controller, a water vapor mass fraction of an exhaust air stream based on the determined water vapor mass fraction of the intake air stream and water vapor from a combustion event;
   determining, at the controller and for a current EGR level, a temperature of the intake air stream mixture at the location upstream of the compressor inlet;
   determining, at the controller and for the current EGR level, an estimated condensation temperature based at least in part on the determined water vapor mass fractions for the intake air stream and the exhaust air stream;
   comparing, at the controller, the determined intake air stream temperature to the estimated condensation temperature; and
   commanding, by the controller, i) the current EGR level as a first maximum EGR level upon determining the determined intake air stream mixture temperature is less than or equal to the estimated condensation temperature, and ii) an increase in the current EGR level by a predetermined amount upon determining that the intake air stream mixture temperature is greater than the estimated condensation temperature.

10. The method of claim 9, wherein commanding the current EGR level as the maximum EGR level includes commanding an EGR valve of the engine system to maintain its current position, and wherein commanding an increase in the current EGR level includes commanding the EGR valve to open an additional predetermined amount.

11. The method of claim 9, further comprising determining, at the controller, a partial pressure of water vapor in the intake air stream at the location upstream of the compressor inlet; and wherein the water vapor mass fraction is determined based on the determined partial pressure of water vapor in the intake air stream.

12. The method of claim 9, further comprising:
   determining an overall air charge temperature (ACT) and a local charge air cooler (CAC) temperature; and
   determining, based on the determined ACT and CAC temperatures, second and third maximum EGR levels before condensation begins in the CAC.

13. The method of claim 12, further comprising:
   comparing the first, second and third determined maximum EGR levels; and selecting the minimum of the first, second and third maximum EGR levels as the current EGR level.

14. The method of claim 13, wherein determining the second and third maximum EGR levels includes using the determined ACT and CAC temperatures as dew point temperatures and determining the second and third maximum EGR levels using the ACT and CAC temperatures as dew point temperatures.

* * * * *